(14.)

JOHN P. VERREE.

Improvement in Elastic Washers.

No. 122,141. Patented Dec. 26, 1871.

Witnesses.
J. Snowden Bell.
Wm. E. Morgan.

John P. Verree
by his Attorney
Henry Baldwin Jr

UNITED STATES PATENT OFFICE.

JOHN P. VERREE, OF PHILADELPHIA, PENNSYLVANIA.

IMPROVEMENT IN ELASTIC WASHERS.

Specification forming part of Letters Patent No. 122,141, dated December 26, 1871.

*To all whom it may concern:*

Be it known that I, JOHN P. VERREE, of the city and county of Philadelphia, in the State of Pennsylvania, have invented a new and Improved Washer for Bolts, of which the following is a specification:

The object of my invention is to provide a simple and efficient device which, while serving the ordinary purposes of a washer, will further prevent the loosening or unscrewing of the nut on its bolt by jarring or vibration, from which much inconvenience and damage have resulted; and my improvement consists in a peculiarly corrugated elastic washer, hereinafter described.

Several devices have been proposed to prevent this loosening. The objections to the use of lock-nuts, which are among the means employed for this purpose, are familiar to all practical mechanics; and nearly all the other devices are complicated and expensive. My improvement affords a simple means of overcoming this loosening tendency, and is applicable to any bolt without requiring connections to be made to other parts.

Figure 1:
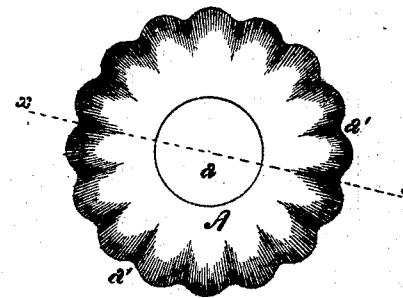
Figure 2:
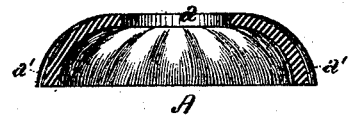

In the accompanying drawing, Figure 1 is a plan or top view of my improved washer; and Fig. 2, a section through the same at the line $x\,x$ of Fig. 1.

The washer A, which is made of any suitable metal, is formed, by a die, into the shape of a shallow cup or dish, with an opening, $a$, at its center, through which the bolt passes, and a series of radial corrugations, $a'$, at its periphery, as clearly shown in the drawing, and, being placed upon the bolt between the nut and its bearing surface, holds the nut to a tight bearing by the elasticity due to its form, and prevents the loosening or unscrewing of the nut from jarring or vibration of the structure or machine in which it is fixed.

The radial corrugations $a'$ of the washer allow it to spread or expand under the pressure brought to bear upon it, and thus its elasticity is easily and fully exerted.

There is another advantage in the use of my improved washer, namely: That, in the event of the surface upon which it rests not being exactly at a right angle with the axis of the screw-bolt, the washer yields variously at different points, thus compensating for imperfect fitting of the parts and preventing side strain upon the screw-threads.

I am aware that dished-metal washers have been heretofore known, and do not broadly claim such device; but What I do claim as my invention, and desire to secure by Letters Patent, is—

A dished elastic washer, having its periphery formed into a series of radial corrugations, as and for the purpose set forth.

JOHN P. VERREE.

Witnesses:
J. SNOWDEN BELL,
WM. S. LYNN.

(14)